F. E. ELLIOTT.
TRAILER ATTACHMENT FOR MOTOR CYCLES.
APPLICATION FILED SEPT. 6, 1917.
1,271,553.
Patented July 9, 1918.
2 SHEETS—SHEET 1.
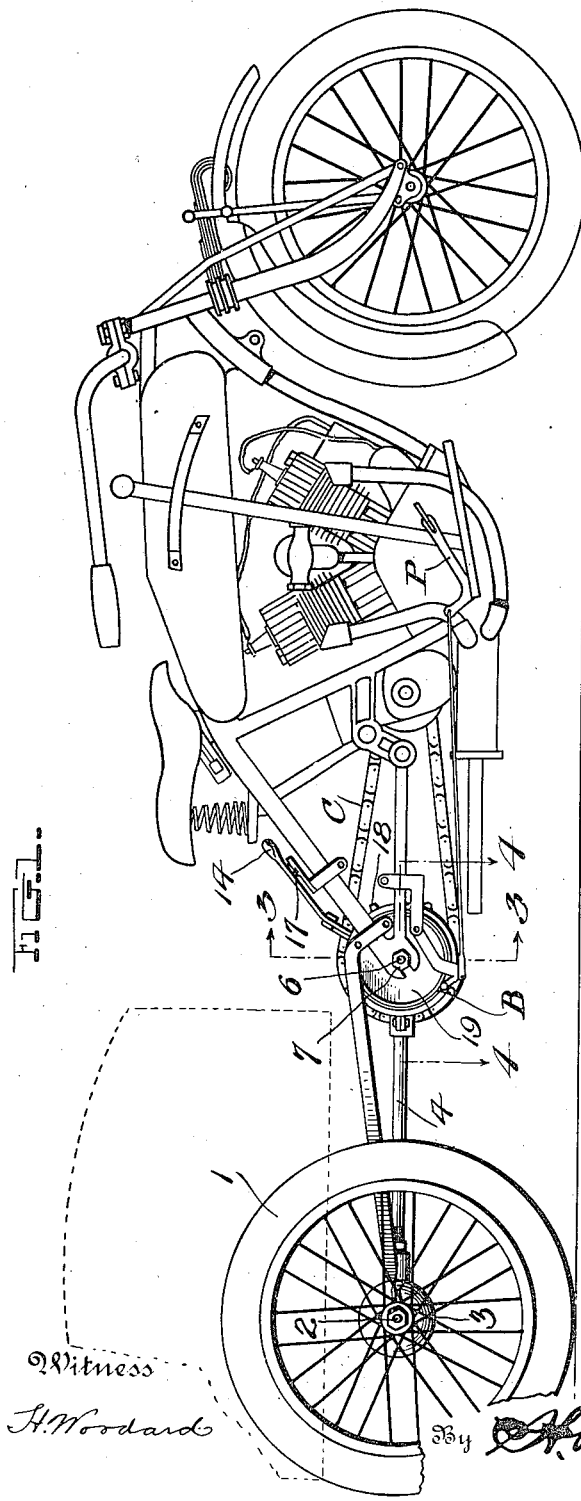
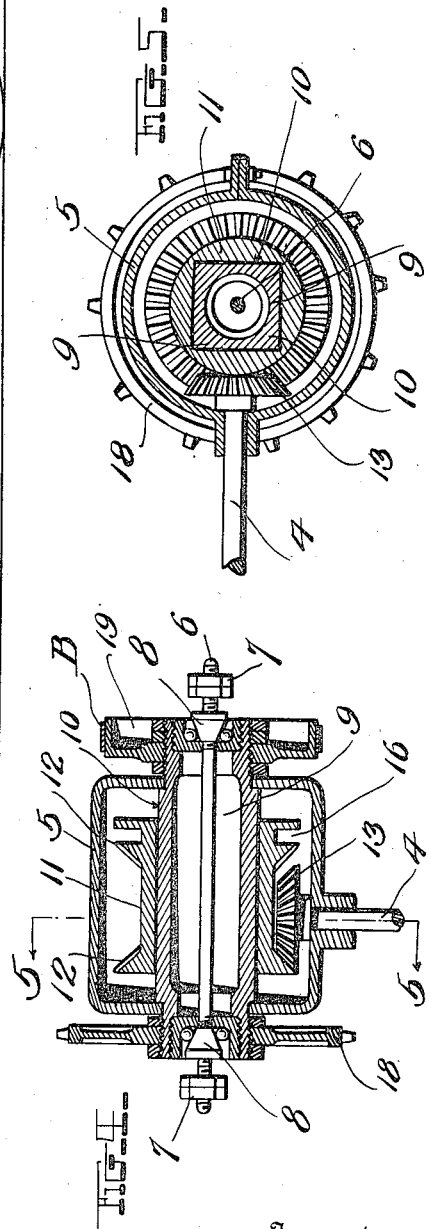
Inventor
F. E. Elliott
By H. B. Willson & Co.
Attorneys
Witness
H. Woodard

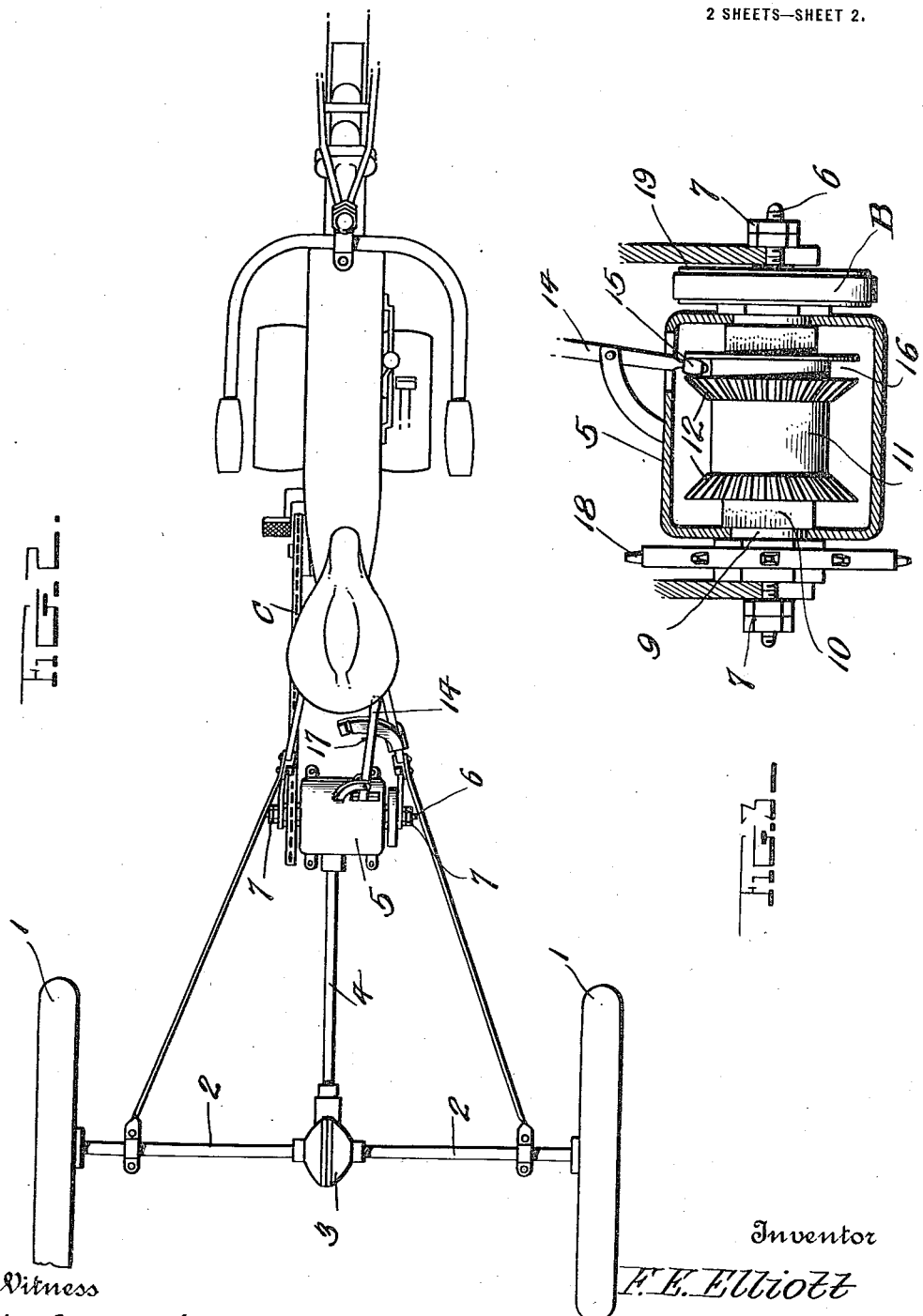

UNITED STATES PATENT OFFICE.

FLOYD E. ELLIOTT, OF LINCOLN, NEBRASKA.

TRAILER ATTACHMENT FOR MOTOR-CYCLES.

1,271,553. Specification of Letters Patent. Patented July 9, 1918.

Application filed September 6, 1917. Serial No. 190,011.

*To all whom it may concern:*

Be it known that I, FLOYD E. ELLIOTT, a citizen of the United States, residing at Lincoln, in the county of Lancaster and State of Nebraska, have invented certain new and useful Improvements in Trailer Attachments for Motor-Cycles; and I do declare the following to be a full, clear, and exact description of the invention, such as will enable others skilled in the art to which it appertains to make and use the same.

My invention relates to improvements in trailer attachments for motor-cycles, and more particularly to those employing two wheels, the principal object being to provide a novel means of driving both wheels in either direction, and for applying a braking action to both of said wheels in stopping, the driving means including a gear box which takes the place of the usual rear wheel of the motor-cycle, so that the chain or belt which previously drove the wheel, may drive the gearing, whereas the usual brake will coöperate with said gearing instead of with the rear wheel.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation of the improved trailer attachment applied to a well known form of motor-cycle;

Fig. 2 is a top plan view of Fig. 1;

Fig. 3 is a vertical transverse section on the plane of the line 3—3 of Fig. 1;

Fig. 4 is a horizontal section on the plane indicated by the line 4—4 of Fig. 1; and Fig. 5 is a vertical section of Fig. 4 on the plane of the line 5—5 thereof.

In the drawings above briefly described, the numerals 1 designate a pair of spaced wheels having independent axle sections 2 equipped with a differential drive 3, a propeller shaft 4 being provided for driving the differential, said shaft extending forwardly from the axle as shown clearly in the drawings. The front end of the shaft 4 extends into a gear box 5 which takes the place of the usual rear wheel of the motor-cycle, said box being held in place by a transverse axle 6 which is clamped by nuts 7 to the rear fork as shown most clearly in Figs. 3 and 4, said axle being of the well known construction.

By means of ball bearings or the like 8, a hollow hub 9 is rotatably supported upon the axle 6, said hub having a squared central portion 10, whereas its ends pass rotatably through the end of the gear box 5. A sleeve 11 is slidable but non-rotatable upon the squared portion of the hub 9, the ends of said sleeve having inwardly facing beveled gears 12, either one of which may be meshed with a third beveled gear 13 which is secured on the front end of the propeller shaft 4.

It will be observed that the gear 13 is positioned between the gears 12, so that by throwing one of said last named gears into mesh with said first named gear, the entire machine will be driven forwardly, whereas by shifting the sleeve 11 to bring the other gear 12 into mesh with gear 13, the vehicle may be reversed.

Any preferred means may be employed for shifting the sleeve 11 for the purposes above set forth, but for illustrative purposes, a suitable hand lever 14 has been shown, the lower end of said lever having a roller or the like 15 traveling in an annular runway 16 on one end of the sleeve, a suitable device 17 being employed for locking the lever 14 in either position. The lever is shown positioned beneath the seat of the machine but it may well be located at any other preferred point.

For driving the hub 9, a sprocket 18 is shown secured on one end thereof for coöperation with the usual chain C of the motor-cycle, but it will be understood that if the machine is of the belt driven type, a belt wheel could well be substituted for this sprocket. Similarly, if the trailer attachment is used on machines employing a longitudinal shaft for driving the rear wheel, suitable gearing or the like will be provided for transmitting motion from this shaft to the hub. In all cases, the hub will be driven from the usual driving means of the rear wheel, so that no alterations whatever will be required in installing the attachment. In the present showing, the end of the hub 9, remote from the sprocket 18, is shown equipped with a brake drum 19 which coöperates with the usual brake band B of the motor-cycle, this band being contracted when necessary by means of the foot pedal P on one of the running boards. Here again, it is to be understood that the showing is only one of the many ways in which the braking action could be transmitted to the hub 9, but regardless of the manner in which this is accomplished, it will be seen that by applying the brake to this hub, the braking action will be transferred to both the rear wheels, through the instrumentality of the driving connections between said hub and wheels. This is of great advantage in stopping the machine in a short space as will be appreciated.

From the foregoing, taken in connection with the accompanying drawings, it will be obvious that although the invention is of extremely simple and inexpensive nature, it will be highly efficient and durable, particular emphasis being laid upon the fact that no alterations whatever are necessary in applying the attachment to the motor-cycle, it being of course understood that slightly different attachments will be made for the different makes of machines. The essentials in all cases, however, will be the same, and in most instances the several specific details of construction shown and described, will be employed. I wish it understood, however, that within the scope of the invention as claimed, numerous minor changes may well be made.

I claim:

1. A trailer attachment for motor-cycles comprising a pair of wheels, a pair of axle sections connected to said wheels and having a differential drive, a propeller shaft extending forwardly from the differential, means for driving said propeller shaft, said means being receivable in the rear motor-cycle fork after removal of the rear wheel, a transverse axle for holding said driving means in said fork, said axle taking the place of the usual rear axle of the motor cycle, and a driving wheel for said driving means coacting with the usual rear wheel driving means of the motor-cycle.

2. A trailer attachment for motor-cycles comprising a pair of wheels, a pair of axle sections connected to said wheels and having a differential drive, a propeller shaft extending forwardly from the differential, a beveled gear on the front end of said propeller shaft, a transverse axle taking the place of the usual rear axle of the motor-cycle after removal of the rear wheel, a hub rotatably mounted on said axle and taking the place of the rear wheel hub, a sleeve slidable endwise on but rotatable bodily with said hub, a pair of beveled gears on said sleeve for mesh with the opposite sides of said first named gear, means for shifting said sleeve to bring either of said pair of gears into play, and driving means on said hub for coaction with the usual driving means of the motor-cycle rear wheel.

3. A trailer attachment for motor-cycles comprising a pair of wheels, a pair of axle sections connected to said wheels and having a differential drive, a propeller shaft extending forwardly from the differential, a beveled gear on the front end of said propeller shaft, a transverse axle taking the place of the usual rear axle of the motor-cycle after removal of the rear wheel, a hub rotatably mounted on said axle and taking the place of the rear wheel hub, a sleeve slidable endwise on but rotatable bodily with said hub, a pair of beveled gears on said sleeve for mesh with the opposite sides of said first named gear, means for shifting said sleeve to bring either of said pair of gears into play, driving means on one end of said hub for coaction with the usual rear wheel driving means of the motor-cycle, and braking means on the other end of said hub.

4. A trailer attachment for motor-cycles comprising a pair of axle sections having wheels at their outer ends and having a differential drive, a propeller shaft extending forwardly from the differential, a gear box receivable in the rear fork of the motor-cycle when the rear wheel is removed and having an axle for securing it in said fork, said axle taking the place of the usual rear axle of the motor cycle, forward and reverse gearing in said gear box for driving said propeller shaft, and a driving wheel for said shaft adapted for coaction with the usual rear wheel driving means of the motor cycle.

In testimony whereof I have hereunto set my hand in the presence of two subscribing witnesses.

FLOYD E. ELLIOTT.

Witnesses:
MARVIN C. HEPLER,
H. H. LAWING.